(No Model.)

F. WISNER.
TEA OR COFFEE POT.

No. 311,455. Patented Jan. 27, 1885.

WITNESSES:
John Cook
C. Sedgwick

INVENTOR:
F. Wisner
BY Munn & Co
ATTORNEYS.

United States Patent Office.

FRED WISNER, OF RIDGWAY, PENNSYLVANIA, ASSIGNOR TO HIMSELF, AND ALANSON MORTIMER HALL, OF OLEAN, NEW YORK.

TEA OR COFFEE POT.

SPECIFICATION forming part of Letters Patent No. 311,455, dated January 27, 1885.

Application filed August 16, 1884. (No model.)

*To all whom it may concern:*

Be it known that I, FRED WISNER, of Ridgway, in the county of Elk and State of Pennsylvania, have invented a new and useful Improvement in Tea and Coffee Pots, of which the following is a full, clear, and exact description.

This invention relates to tea and coffee pots fitted with a strainer in the body of them; and it consists in a novel construction of the body of the pot and attachments thereto for supporting and entering or removing, as required, a detachable strainer provided with a handle, and serving to pour freely and keep back all sediment, or, in other words, to strain beneath the spout the beverage as it is poured from the pot. The lower portion of the body of the pot is also made so flaring as to secure a large heating-surface on the stove, whereby the boiling action is quickened, and the handle is protected from heat, which facilitates the handling of the strainer at any or all times.

Reference is to be had to the accompanying drawings, forming a part of this specification, in which similar letters of reference indicate corresponding parts in all the figures.

Figure 1:
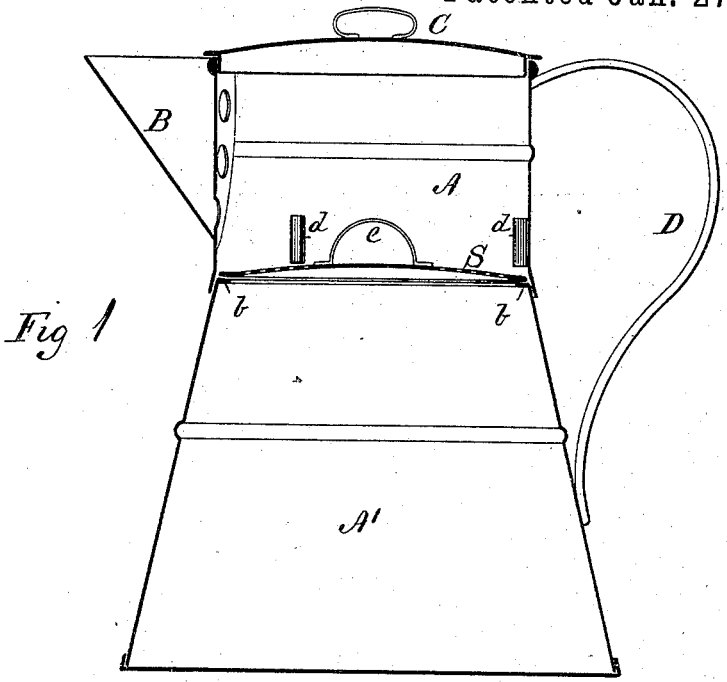
Figure 2:
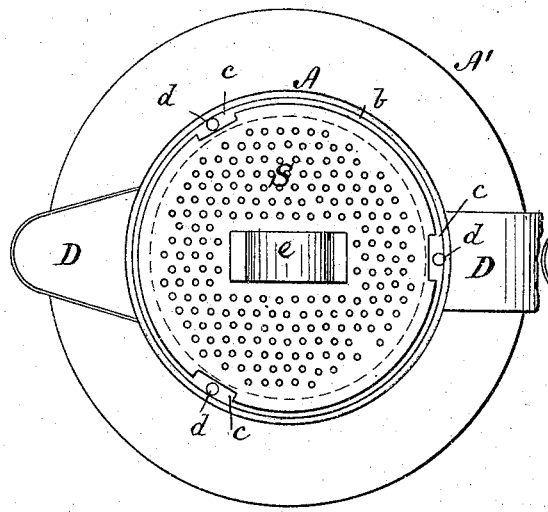
Figure 3:
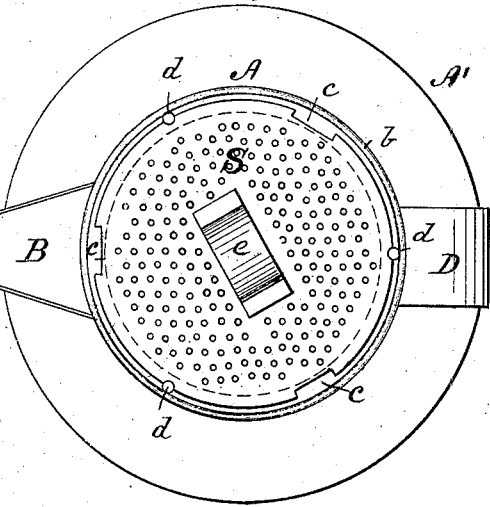

Figure 1 represents a vertical section of a tea and coffee pot embodying my invention; and Figs. 2 and 3, plan views of the pot with the cover removed, and showing, respectively, the removable strainer in its locked and unlocked positions.

A A' indicate the body of the pot, the part A being soldered where joined to its part A'; B, its spout, C its lid, and D the handle thereof. The upper part, A, of the body is of cylindrical form, while its lower part, A', is in the form of a frustum of a cone, and is made to present an extended bottom surface, as and for the purposes hereinbefore specified. The upper edge of the bottom part, A', is burred and turned in to form a shoulder, $b$, for the removable strainer S to rest upon and keep it in place. Said strainer, which is made to fit freely or easily within the upper part, A, of the body, is adjusted in position and locked or prevented from coming out or leaving its seat $b$ by constructing it with notches $c\ c$ in its edge and soldering to the interior of the upper part, A, at a proper distance above the seat or shoulder $b$, a corresponding number of wires or projections, $d\ d$, so as to allow of the strainer, when its notches $c\ c$ are in line with the projections $d\ d$, being entered down within the upper part, A, onto its seat $b$, and afterward of being turned so as to bring its unnotched portion under the wires or projections $d\ d$, as shown, respectively, in Figs. 2 and 3. On the other hand, when it is required to remove the strainer, it is turned again to bring its notches $c\ c$ in line with the locking projections $d\ d$, when it may readily be lifted out for cleaning or other purposes. The strainer may thus be very easily and readily adjusted, and to facilitate the same and the handling of it it is fitted on its upper surface with a handle, $e$.

Having thus described my invention, I claim as new and desire to secure by Letters Patent—

In combination with the upper and lower portions, A A', of the body of a tea and coffee pot, the lower part, A', of which is made flaring in a downward direction, and the upper edge of which is turned in to form a shoulder, $b$, the strainer S, provided with a handle, $e$, and having notches $c\ c$ in its edge, and the locking wires or projections $d\ d$ on the interior of the upper part of the body, substantially as shown and described, and for the purposes herein set forth.

FRED WISNER.

Witnesses:
   OTIS D. CRAWFORD,
   D. B. HAMILTON.